United States Patent [19]

Kreager, Jr.

[11] Patent Number: 4,919,740

[45] Date of Patent: Apr. 24, 1990

[54] METHOD AND APPARATUS FOR FORMING FIN-TYPE BACK SEALS

[75] Inventor: William D. Kreager, Jr., Dallas, Tex.

[73] Assignee: Frito-Lay, Inc., Dallas, Tex.

[21] Appl. No.: 319,845

[22] Filed: Mar. 7, 1989

Related U.S. Application Data

[63] Continuation of Ser. No. 82,415, Aug. 6, 1987, abandoned.

[51] Int. Cl.⁵ .............................................. B32B 31/14
[52] U.S. Cl. ...................................... 156/203; 53/451;
53/545; 53/551; 156/215; 156/218; 156/289;
156/308.4; 156/323; 156/466; 156/583.9
[58] Field of Search ............ 156/203, 466, 218, 583.9,
156/199, 200, 204, 212, 215, 217, 289, 308.2,
308.4, 323, 324, 446, 459, 461, 492; 53/451, 545,
551

[56] References Cited

U.S. PATENT DOCUMENTS

| | | | |
|---|---|---|---|
| 2,154,183 | 4/1939 | Raney | 156/583.9 |
| 2,385,897 | 10/1945 | Waters | 53/451 |
| 2,538,149 | 1/1951 | Fannen et al. | 156/583.9 |
| 3,480,470 | 11/1969 | Kiefer | 156/466 |
| 3,807,118 | 4/1974 | Pike | 53/451 |
| 3,830,681 | 8/1974 | Wilson | 156/583.9 |
| 3,935,048 | 1/1976 | Rucker | 156/203 |
| 3,992,854 | 11/1976 | Howell | 53/451 |
| 4,103,473 | 8/1978 | Bast et al. | 353/551 |

Primary Examiner—Merrell C. Cashion, Jr.
Attorney, Agent, or Firm—Bernard, Rothwell & Brown

[57] ABSTRACT

An improved apparatus and method for providing uniform fin-type back seals with flexible packaging material for use in conjunction with form-fill-and-seal machines is disclosed which utilizes a moveable tucker plate disposed between the mated edges of the flexible packaging material and the body of the packaging material. When sealing, the tucker plate moves against the body of the packaging material and prevents lateral movement of such material during the sealing operation. The tucker plate is joined to a sealing platen in a manner which maintains a fixed distance between the tucker plate and the sealing platen until a threshold sealing pressure is exceeded.

9 Claims, 3 Drawing Sheets

METHOD AND APPARATUS FOR FORMING FIN-TYPE BACK SEALS

This is a continuation of application Ser. No. 082,415 filed Aug. 6, 1987, now abandoned.

FIELD OF THE INVENTION

This invention relates to an improved apparatus and method for providing a fin-type seal with flexible packaging material used with form-fill-and-seal machines. More particularly, the present invention provides an apparatus and means for producing substantially uniform, fin-tye back seals with flexible packaging materials processed through form-fill-and-seal equipment.

BACKGROUND OF THE INVENTION

Form-fill-and-seal machines are commonly used to package many items, such as snack foods, candies and the like, in flexible bags. These machines utilize a continuous roll of packaging material to form a bag, fill the bag with product, and seal the bag. Continuity and completeness of the sealing function, both back and end seals, is of crucial importance to packaging snack foods, as a leak in the bag can lead to loss of product freshness. To this end, much effort has been devoted to the development of apparatus to produce back and end seals with a high degree of integrity. One such back seal that has been developed is a fin-type seal wherein the inner sealable face of one edge portion of the packaging material makes with the inner sealable face of the opposite edge portion which is folded together in one direction back towards the so-formed bag. Sealing means is applied so that the two mated edges form a fin-type seal.

Various problems are inherent to fin-type back seals. A prevalent problem is adherence of the sealing material to the processing equipment. Especially with thermally sealed packaging materials, undesirable adherence to the process equipment can cause incomplete seals, torn packaging material and unwanted machine downtime. Poorly mated edge seals can also display the inner sealing layer which is frequently not the same color as the exterior of the package. This detracts from the overall appearance of the finished product. A final concern with forming fin-type seals is the tendency toward arcuate misalignment along the fin length which sometimes fails to form a continuous seal. This inherent preference for arcuate misalignment is especially pronounced when the packaging material is an all polymeric material such as multi-plies of polypropylene and polyethylene.

U.S. Pat. No. 3,935,048 to Rucker entitled "Method for Forming Containers With Fin-Type Seams" addressed the problems inherent in forming fin-type seals. Rucker disclosed an apparatus wherein the mated edges of the packaging film are pulled and slid over a backup plate extending between the mated edges and the body of the packaging material to prevent scuffing of the heat sealable material against a back supporting filling tube. A tracking wheel engaging the mated edges presses them against the backup plate to maintain alignment. While this teaching addressed several of the problems inherent with fin-type seals using end seal jaw advancement of the film, problems still remain with fin-type seals, such as arcuate misalignment on machines where the film is advanced by side pull belts and sealed later. What is needed is an improved apparatus for providing uniform fin-type back seals of flexible packaging material.

It is one object of the present invention to provide an apparatus for producing uniform fin-type back seals of flexible packaging material in conjunction with form-fill-and-seal machines.

It is a second object of the present invention to provide a method by which such uniform fin-type seals may be obtained.

These and other objects of the present invention will become obvious from the following description of the invention and the appended claims.

SUMMARY OF THE INVENTION

The present invention relates to an apparatus for providing uniform fin-type back seals of flexible packaging material in conjunction with form-fill-and-seal machines of the type that utilize a filling tube, mate the edges of the flexible packaging material, fold the mated edges in one direction against the body of the packaging material, and move the packaging material intermittently through forming and filling stages, the apparatus comprising:

(a) a moveable sealing platen which extends parallel to the filling tube, and having the flexible packaging material and its folded, mated edges disposed therebetween;

(b) a moveable tucker plate positioned about parallel to the sealing surface of the platen, pivotally joined to the platen and disposed between the body of the packaging material and the folded, mated edges thereof;

(c) means for maintaining the tucker plate at fixed distances from the filling tube and the sealing platen when not under sealing pressure; and, (d) means for applying intermittent sealing pressure so as to rigidly hold the body of the packaging material between the filling tube and the tucker plate, and to compress and seal the mated edges between the tucker plate and the sealing platen.

The invention also relates to a method for providing uniform fin-type back seals of flexible packaging material including the steps of:

(a) providing a web of flexible packaging material;

(b) bringing the edges of said web into touching contact such that the same surface of the web is contacted at the edges;

(c) immobilizing said web adjacent to at least one of the edges; and, (d) applying pressure to said edges so as to form a fin-type back seal.

DETAILED DESCRIPTION OF THE INVENTION

In accordance with the present invention there is provided an apparatus and method for providing a fin-type back seal on packaging material used in intermittent motion form-fill-and-seal package machines.

The apparatus taught herein may be adapted for use with the various styles and types of packaging equipment in commercial use, such as Hayssen bag making machines available from the Hayssen Manufacturing Company, Sheboygan, Wis., and Woodman bag making machines available from the Woodman Systems Division of Kliklok Corporation, Decatur, Ga.

These commercial machines come in a variety of styles and modes of operation such as vertical and slant form-and-fill machines, machines that operate with and without reverse reciprocating seal systems, and machines that utilize film pull belts or end seal film pull type machines.

Materials used for such packaging are typically webs of multi-ply films with printing embedded within the plies to produce packaging having enhanced appearance and appeal.

Packaging materials may be thin films derived from cellulose, such as paper, cellophane and glassine films; or may be polymeric, such as polypropylene, polyethylene and high density polyethylene; and multi-ply combinations of the above films. Such multi-ply packaging materials have thicknesses that vary from about 2 mils. (0.05 mm) to about 4 mils. (0.10 mm).

Many such multi-ply films comprise synthetic polymeric compositions having thermally activated sealants disposed in the inner ply thereof for back fin seals. Alternatively, cohesive coating strips, as taught in U.S. Pat. No. 4,555,289 to Kreager, may be provided near the edges of the film that can be mated and cold-sealed to provide a fin-type seal.

The present invention is particularly well-suited for reducing the non-uniform arcuate fin-type back seals that are prevalent with the use of synthetic polymeric packaging films, which have a structure memory and do not readily maintain a fold or bend in the film.

The apparatus of the present invention is adaptable for use with commercially available form-fill-and-seal machines that incorporate a filling tube. In a typical such device packaging material is compressed between the filling and a seal platen. To ensure a continuous seal and to reduce wear, the filling tube is generally padded on that side against which the seal platen is directed. With time and repeated sealing operations, the padding may become embrittled or otherwise unstable.

The need for such padding is eliminated in the present invention by the use of a tucker plate, external to the so-formed bag, against which the platen seals. The tucker plate is made of a thin high strength material to accomodate itself into a narrow space and to withstand cycling pressures and heat without distortion. It is also desirable to provide the tucker plate with a layer of a low-friction material such as tetrafluoroethylene, in the form of a coating or adhesive tape, to reduce friction between the plate and the moving packaging material as well as to reduce any adhesion to the plate due to the adhesive's inherent to the packaging material. An example of a fabricated tucker plate is a plate made of 0.062 gauge blue polished spring steel having a tetrafluoroethylene tape on its surface that contacts the packaging film edges.

The tucker plate is pivotally attached to the seal platen. Preferably, the tucker plate is attached to the seal platen by means of a removable hinge. The tucker plate can easily be swung out of the way or detached if one desires to operate the sealing apparatus in a conventional mode. In this manner the apparatus can be used to form fin-type back seals as taught herein and can also be operated without the tucker plate to form lap seals, a seal formed by two flat overlaping edges of packaging material.

Between the pivotally attached tucker plate and the seal platen there is disposed a separation means that maintains a predetermined distance between the tucker plate and the platen's sealing surface when the apparatus is in its inactivated, or relaxed, position. In a preferred embodiment, the separation means comprises a spring ball plunger set into the seal platen to maintain such separation. In the operation of the apparatus the separation means is overridden during sealing when the sealing process exceeds a threshold level so that a compressive force is exerted on the packaging material edges disposed between the tucker plate and the seal platen.

As with the tucker plate, the seal platen, especially its sealing surface may be coated with a low friction material such as tetrafluoroethylene. The seal platen is attached to pressurizing means, such as pneumatic device, that exerts the sealing pressure during activation. In the case of thermal sealing or thermally activated adhesives, the seal platen is preferably provided with heating means, such as at least one heating element, to furnish the necessary thermal requirements for sealing.

The distances between the filling tube and the tucker plate and the tucker plate and the seal platen in their relaxed mode, are adjustable to accomodate packaging materials of varying thicknesses. The optimum distances, temperature and sealing pressure will vary depending on the packaging material being used.

In operation, the sealing pressure exerted on the seal platen first directs the tucker plate toward the filling tube contraining the packaging materials therebetween. Subsequently, the sealing pressure overcomes the separation means and propels the seal platen against the tucker plate, compressing and sealing the packaging material edges disposed therebetween. By this method, lateral movement of the packaging material is inhibited during the sealing motion, resulting in more uniform fin-type seals.

The following drawings and example demonstrate the effectiveness of the subject invention. It is to be understood that these drawings and examples are utilized for illustrative purposes only, and are not intended in any way to be limitative of the present invention.

It is noted that the same feature shown in more than one of the figures is identified by the same notation.

DETAILED DESCRIPTION OF THE DRAWINGS

Figure 1:
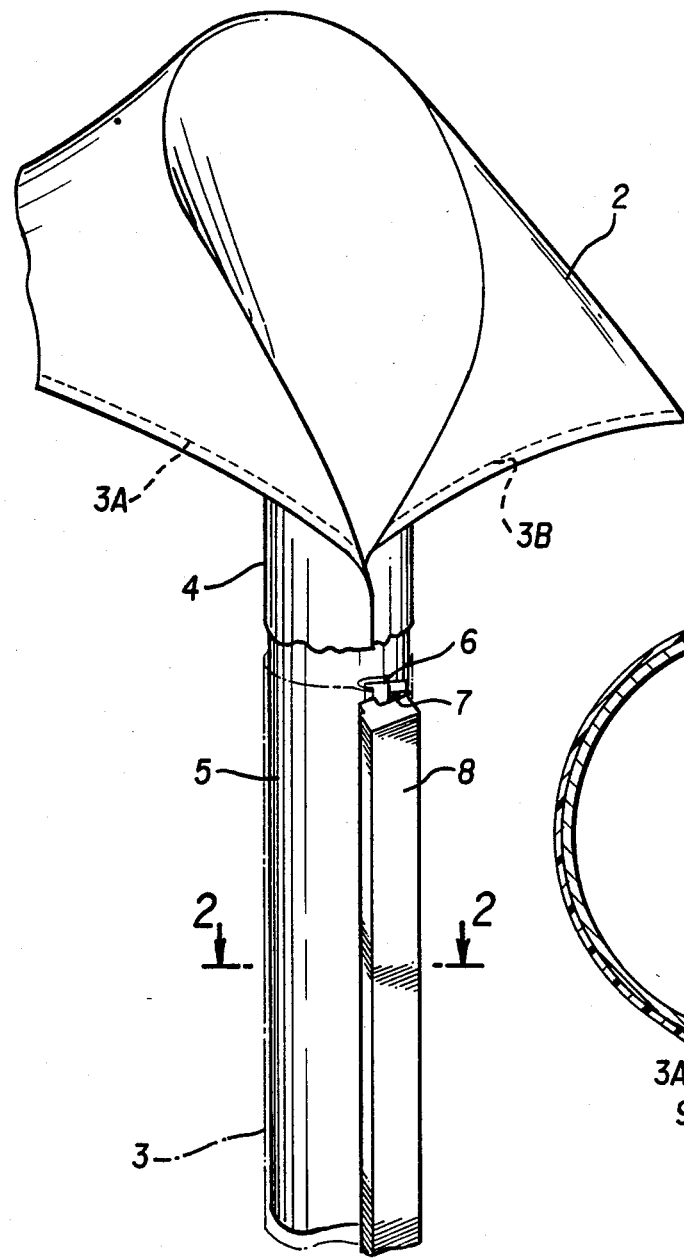
FIG. 1 is a schematic drawing of a portion of a form and fill machine incorporating the present invention.

FIG. 1 depicts the subject apparatus in use on a form-fill-and-seal machine. Such a machine utilizes a shoulder 2 over which a roll, or web, of flexible packaging material is passed and shaped into a tube, as it passes into the collar 4. Opposing edges of the web are shown in dotted lines on the shoulder 2 and identified as 3A and 3B. The operation of such an apparatus is well known in the art. From the collar, the packaging material passes over a filling tube 5. The edges of the material 3A and 3B are mated together and folded in one direction. Disposed between the folded edges and the body of the packaging material 3 is tucker plate 6 that is pivotally connected to sealing platen 8. Spring ball plunger means 7 maintain the tucker plate 6 at a fixed distance from the seal platen 8 when in a relaxed mode. The operation of the apparatus disclosed herein is described below with reference to FIGS. 2 and 3A-D.

Figure 2:
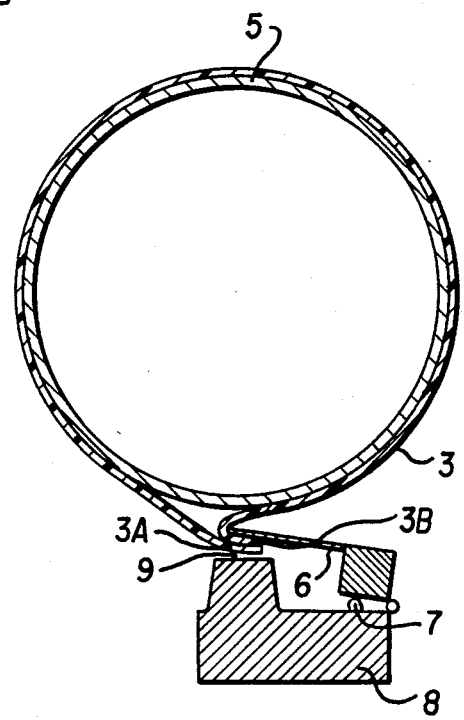
FIG. 2 is a cross-section view of the apparatus show in FIG. 1 taken through line 2—2

FIG. 2 is a horizontal cross sectional view taken through line 2—2 of FIG. 1. As this figure shows, the packaging material 3 is disposed around the filling tube 5. The edges of the packaging material 3A and 3B are mated together so that the same surface of the packaging material contacts itself at the edges. The edges are then folded in one direction and separated from the body of the packaging material 3 on filling tube 5 by the tucker plate 6. The distance between the filling tube 5 and the tucker plate 6 is adjustable to accomodate packaging materials of varying thicknesses. The tucker plate 6 is pivotally attached to a portion of the seal platen 8. Separation means is provided to maintain the tucker plate 6 a fixed distance from the platen's sealing surface 9. In the figure, the separation means to maintain this distance comprises a spring ball plunger mechanism. This mechanism is overridden during the sealing process.

Figure 3A:
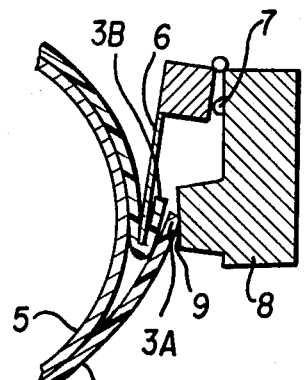
FIG. 3A–D are cross-sectional views of a portion of the apparatus depicted in FIG. 2 showing the step-wise formation of a fin-type seal in accordance with the present invention.

FIGS. 3A-D show the sequence by which a fin-type seal is formed in accordance with the invention. In its relaxed, state as shown in FIG. 3A, a preset distance is maintained between the filling tube 5 and the tucker plate 6, as well as the preset distance between the tucker plate 6 and the sealing platen surface 9 maintained by the separation means. When the packaging material 3 has advanced through the form and fill machine a predetermined length, as by pull belts, the material's length-wise movement is stopped and the sealing apparatus is activated. The length-wise movement and sealing activation may be governed by a device that measures pull length, by reading coded markings in the packaging material itself, or by other means apparent to those familiar with the art.

Figure 3B:
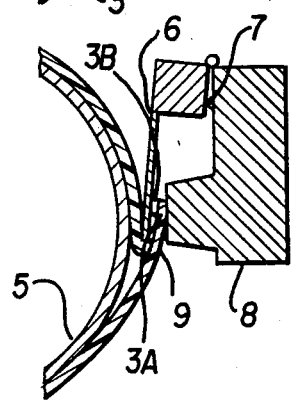
Figure 3C:
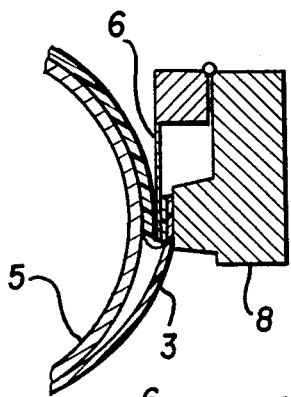

The sealing apparatus performs two functions, as shown in FIGS. 3B and 3C. Sealing pressure exerted against the seal plate 8, by means not shown in the figure, initially is transferred to the tucker plate 6 which advances toward the filling tube 5 and rigidly holds the body of the packaging material 3 in place between the filling tube and the tucker plate, as shown in FIG. 3B. This prevents lateral movement that would otherwise contribute to arcuate travel along the length of the packaging material edge 3A. Once the sealing pressure overcomes the force maintained by the separation means between the tucker plate and the seal platen, the platen is advanced toward the tucker plate and exerts pressure against the packaging material edges disposed therebetween, as shown in FIG. 3C. In the case of sealing by thermally activated agents in the packaging material, the seal platen is heated and provides both heat and pressure for sealing.

Figure 3D:
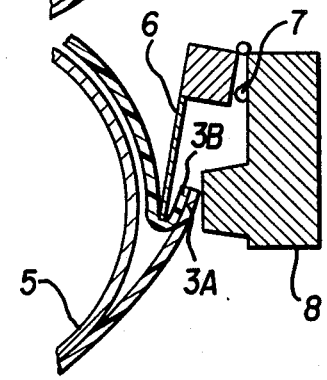

After sealing, the seal platen and the tucker plate return to their relaxed positions, as shown in FIG. 3D. Separation means between the tucker plate and the seal platen reestablishes the predetermined distance between these two features and the packaging material, now possessing a uniform fin-type seal, can be advanced for further processing.

EXAMPLE

The following example is provided to further illustrate the subject invention. A commercially available form, fill and seal machine, Hayssen Ultima II available from the Hayssen Manufacturing Company, Sheboygan, Wis., was used to form fin-type back seals on an all-polymeric multi-ply material. The film material had a thickness of about 3 mils. (0.075 mm) and comprised a first outer layer of polypropylene, a second middle layer of polyethylene, and a third layer of high density polyethylene coextrusion. The inner layer, which was mated at the edges to form the fin-type seal contained a co-extruded thermally sensitive other ply.

The form-fill-and-seal machine was operated as it is commercially available as a control run, and then modified in accordance with the present invention and operated as taught herein. The machine ran in an intermittent mode forming a back seal after advancing the packaging material about fifteen inches. The effectiveness of the back seals formed by the control and by this invention were evaluated by inspecting the so-formed fin-type seals.

Figure 4:
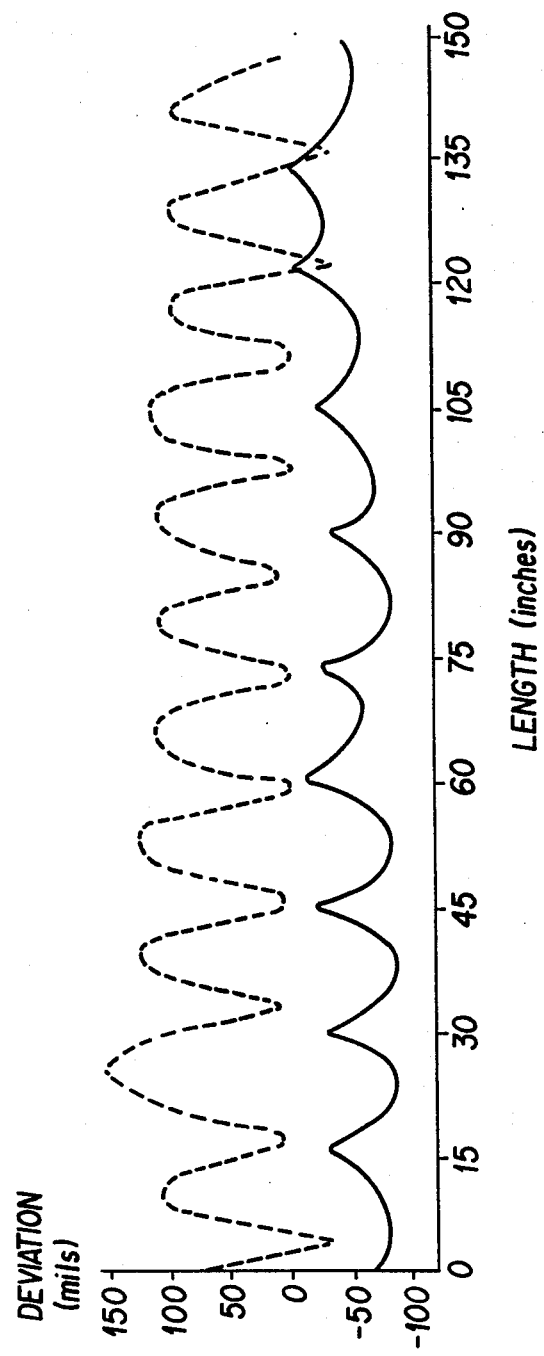
FIG. 4 is a chart of fin-seal deviation, measured in millimeters, as a function of film length for seals formed with and without the subject invention apparatus, and is further discussed in conjunction with the Example presented below.

The results of this test are displayed graphically in FIG. 4. FIG. 4 depicts the degree of mismatch between the edges of the film material after the fin-type seal had been formed. At zero in the figure, the opposing edges of the film material are about exactly mated and sealed. Positive variations from the zero mark indicate deviations from uniform mating of the edges in a manner that also exposed the film's inner sealant ply after sealing. This is eqivalent to exposure, after sealing, of material edge 3B in the prior figures. Exposure of this ply increases the probability that the film may experience difficulties due to undesirable adhesion to processing equipment. The appearance of the so-formed bag is also marred as the inner sealant ply is generally not of the same color as the outer surface of the packaging material. Negative variations from the zero mark indicate deviations from uniform mating of the edges in a manner that does not expose the film's inner sealant ply. This is equivalent to overlap, after sealing, of material edge 3A in the prior figures.

As can be seen from FIG. 4, the control tests, indicated by the dotted line in the figure, show wide deviation from uniform sealing with each intermittent sealing step and also exposes the films inner sealant ply in an undesirable manner. The tests conducted with the apparatus disclosed herein, shown in the figure by the solid line, exhibit markedly reduced deviation from uniform mating, and, where deviation did occur, such deviation did not expose the inner sealant ply to subsequent processing steps nor in a way to detract from the final appearance from the so-formed bag.

Inasmuch as the present invention is subject to may variations, modifications and changes of detail, a number of which have been expressly stated herein, it is intended that all matter described throughout this specification or shown in the accompanying drawings be interpreted as illustrative and not in a limiting sense. It is evident that an apparatus constructed in accordance with the present invention and the method of using such an apparatus and reasonable equivalents thereto will accomplish the objects of the present invention. The scope of the invention is intended to include all modifications and variations that fall within the scope of the attached claims.

I claim:

1. An apparatus for providing uniform fin-type back seals of flexible packaging material in conjunction with form-fill-and-seal machines of the type that utilize a filling tube, mate the edges of the flexible packaging material, fold the mated edges in one direction against the body of the packaging material, and move the packaging material intermittently through forming and filling stages, the apparatus comprising:

(a) a movable platen having a sealing surface which extends parallel to said filling tube;

(b) a movable tucker plate positioned about parallel to the sealing surface of said platen, pivotally mounted on and supported by said platen, and disposed between the platen and the filling tube, wherein the folded, mated edges of flexible packaging material are disposed between the movable platen and the tucker plate and wherein the body of said packaging material is disposed between the tucker plate and the filling tube;

(c) separation means for maintaining said tucker plate at a fixed distance from said sealing platen when not under sealing pressure; and, (d) means for applying intermittent sealing pressure so as to rigidly hold said body of said packaging material between said filling tube and said tucker plate, and to compress and seal the mated edges between said tucker plate and said sealing platen.

2. The apparatus in accordance with claim 1 wherein said sealing platen is coated with a low-friction material.

3. The apparatus in accordance with claim 2 wherein said low-friction material is tetrafluoroethylene.

4. The apparatus in accordance with claim 1 wherein said tucker plate is coated with a low-friction material.

5. The apparatus in accordance with claim 4 wherein said low-friction material is an adhesive strip of tetrafluoroethylene.

6. The apparatus in accordance with claim 1 wherein said separation means comprises a spring ball plunger recessed into said sealing platen.

7. The apparatus in accordance with claim 1 wherein said tucker plate is pivotally joined to said sealed platen by means of a removeable hinge.

8. A method for providing uniform fin-type back seals of flexible packaging material in conjunction with a web of said packaging material and a form-fill-and-seal machine of the type that utilizes a filling tube and which advances the packaging material through said machine in an intermittent manner, the method comprising the steps of:

(a) providing a form-fill-and-seal machine having a filling tube, which machine advances the packaging material through said machine in an intermittent manner;

(b) providing a movable platen having a sealing surface which extends parallel to said filling tube;

(c) providing a movable tucker plate positioned about parallel to the sealing surface of said platen, pivotally mounted on and supported by said platen, and disposed between the platen and the filling tube;

(d) providing means for maintaining said tucker plate at a fixed distance from said sealing platen when not under sealing pressure;

(e) bringing the edges of said web into touching contact such that the same surface of the web is contacted at the edges;

(f) folding the edges in touching contact in one direction against the body of said packaging material;

(g) applying pressure to said tucker plate disposed between the body of said packaging material and the edges of said material so as to constrain the body of said packaging material between said filling tube and said tucker plate; and (h) applying pressure to said sealing platen which compresses the edge of said packaging material between said tucker plate and said platen and seals said edges to form fin-type seals.

9. An apparatus for providing uniform fin-type back seals of flexible packaging material in conjunction with form-fill-and-seal machines of the type that utilize a filling tube, mate the edges of the flexible packaging material, fold the mated edges in one direction against the body of the packaging material, and move the packaging material intermittently through forming and filling stages, the apparatus comprising:

(a) a movable platen having a sealing surface which extends parallel to said filling tube;

(b) a movable tucker plate positioned about parallel to the sealing surface of said platen, pivotally joined to said platen, and disposed between the platen and the filling tube, wherein the folded, mated edges of flexible packaging material are disposed between the movable platen and the tucker plate and wherein the body of said packaging material is disposed between the tucker plate and the filling tube;

(c) separation means for maintaining said tucker plate at a fixed distance from said sealing platen when not under sealing pressure; and, (d) means for applying intermittent sealing pressure by said platen, which pressure then is transferred to said tucker plate and then to said filling tube wherein said pressure is applied between said platen and said filling tube with said tucker plate positioned therebetween so as to rigidly hold said body of said packaging material between said filling tube and said tucker plate, which pressure applied between the platen and the filling tube with said tucker plate positioned therebetween compresses and seals the mated edges between said tucker plate and said sealing platen.

* * * * *